United States Patent [19]
Burks

[11] 3,767,315
[45] Oct. 23, 1973

[54] FLUID ASSISTED DRILL CONSTRUCTION

[76] Inventor: Daniel S. Burks, 13511 Bartlett St., Rockville, Md.

[22] Filed: Dec. 30, 1971

[21] Appl. No.: 214,043

[52] U.S. Cl. ................................................. 408/59
[51] Int. Cl. ............................................. B23b 51/06
[58] Field of Search .......................... 408/56, 57, 59

[56] References Cited
UNITED STATES PATENTS

| | | | |
|---|---|---|---|
| 2,610,529 | 9/1952 | Atkinson | 408/59 |
| 3,191,463 | 6/1965 | Ladendorf | 408/59 |

Primary Examiner—Francis S. Husar
Attorney—Fidelman, Wolffe & Leitner

[57] ABSTRACT

A deep hole drill construction having a pointbody, the shank of the drill consisting of a tubular shaft, the open end of which communicates with relieved areas on said pointbody through which coolant may be pumped by either forcing it down into the tube and evacuating it up through the annulus generated between the hole and the drill shank or by pumping it thorugh said annulus and evacuating it through the tube or drill shank to both facilitate swarf removal and cooling of the pointbody.

28 Claims, 7 Drawing Figures

PATENTED OCT 23 1973  3,767,315
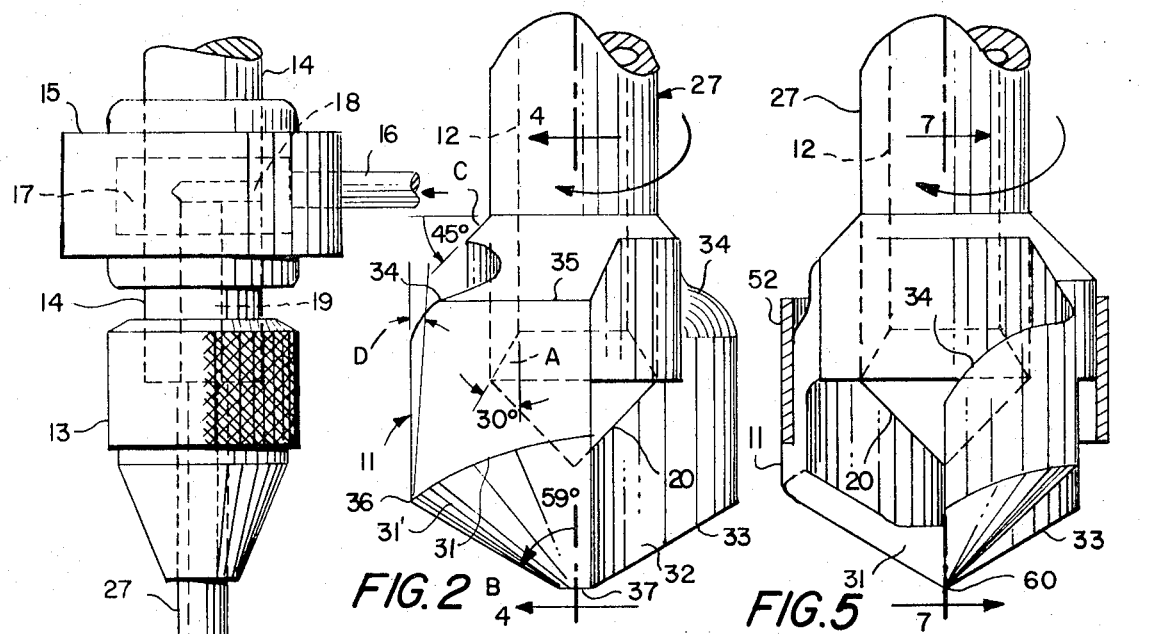
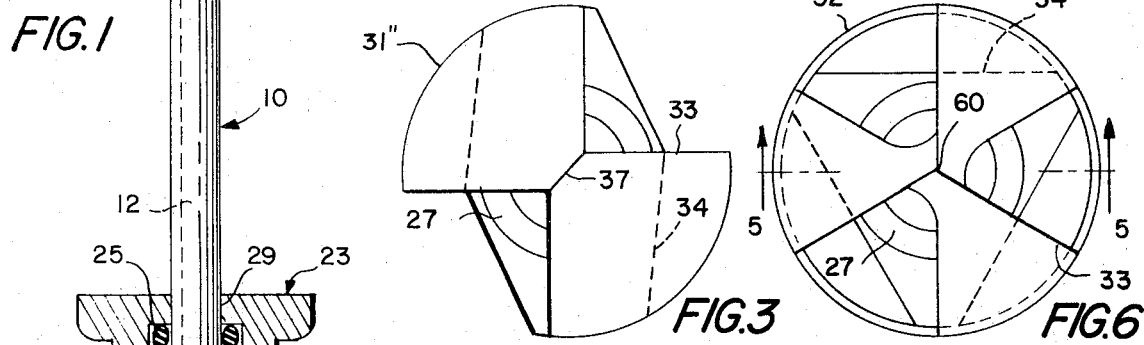
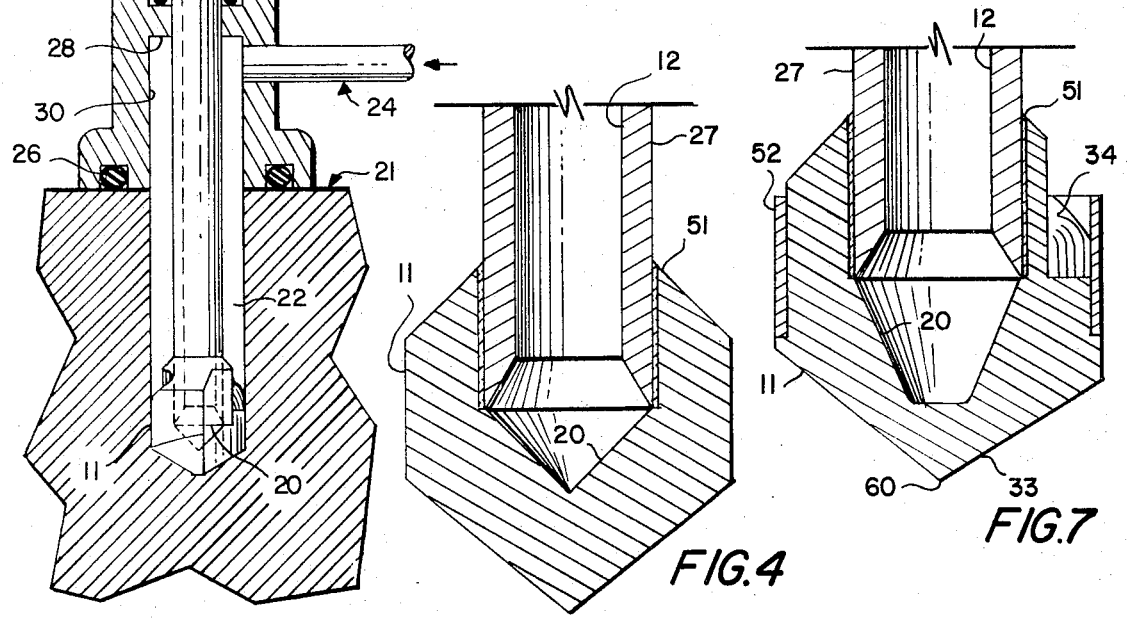

3,767,315

FLUID ASSISTED DRILL CONSTRUCTION

BACKGROUND OF THE INVENTION

In industrial machining operations that require rapid metal removal rates, moderate tolerances and seek deep holes (defined as greater than one drill diameter) with minimum tool breakage, carbide-tipped oil-hole twist drills currently dominate the field. A durable and relatively dependable performer in its own right, the oil hole twist drill's versatility is notably increased by the addition of carbide cutting lips. The pentagonal carbide drill point insert is commonly used for this purpose and lends attractive advantages in that it is inexpensive. A variety of different carbide compositions are available for varying feeds and speeds as well as differing work materials, and it can be readily replaced or reground thereby extending tool life indefinitely.

Tht twist drill, however, includes some distinct advantages yet to be overcome. Oil-hole twist drills of extended length are quite expensive to fabricate and prone to shank fracture. Deep hole drilling normally requires a machining practice commonly known as "wood-peckering." In this application, since drill wear is substantially increased and swarf jams tend to become more frequent, the drill must be regularly removed from the workpiece during the cut to reduce the potential of jamming and to cool the cutting lips. This practice quite naturally reduces efficiency, and in transfer station operations, multiplies capital machining costs. The greatest disadvantage, however, in high speed machining applications of the twist drill, resides in the tool's susceptibility to chatter vibration. The twist drill's propensity to vibrate, or chatter, at machine induced or self-excited frequencies is an inherent characteristic of its structure. A deleterious mechanism in its own right, in applications using carbide cutting lips, the chatter vibration phenomena rapidly produces catastrophic failure of the drill point and attendant drill shank failure in the following manner:

The helical configuration of the twist drill lands and depth of its flutes conspire to notably reduce the torsional shearing strength of the drill shank and significantly reduces its natural vibratory frequency. At high feeds and speeds the drill lands tend to function as a helical spring and when a natural or harmonic frequency is attained, the lands wrap and unwrap (load and unload) in an amplified fashion which translates into axial motion and displacement, and beats the cutting lips, at high frequency, upon the bottom of the blind hole. While carbide remains an excellent cutting material due to its high hardness properties, it is, nevertheless, extremely brittle and rapidly fails in a catastrophic fashion in this environment.

Basic mechanics teaches that in structural members subjected to torsional loading, maximum resistance resides in the material or "fiber" at the greatest distance from the axis of twist, those fibers laying along the axis of the twist offering "zero" resistance to such a load. Moreover, any departure in structure from a perfectly round cross section will impose varying degrees of warp (axial displacement in the outermost fibers) when subjected to torsional loads. Of profound significance to this invention is the structural resistance to torsional deflection (commonly defined in the discipline of Applied Mechanics by the Polar Moment of Inertia -- "J") increases as a function of the fourth power of increasing radius and circular cross section; and that classically, the strongest and most economical structure for applied torsional loads remains the hollow circular shaft.

Therefore, it is an object of this invention to provide a drill construction that will avoid the above identified structural deficiencies of the carbide-tipped oil hold twist drill.

It is a further object of this invention to provide a drill construction that will provide an unobstructed high pressure, high volume coolant flow rate to rapidly remove swarf, lubricate bearing surfaces and cool cutting surfaces.

It is another object of this invention to provide a drill structure that will permit the interchangeable use of an inner diameter flush for improved surface finish and reduced swarf jams or an outer diameter annulus flush, as currently employed in most production machining operations as a rapid and effective swarf removal expedient.

A further object of this invention is to provide a drill structure that will accommodate multiple cutting lips and the increased machining accuracy inherent to this design.

A still further object of this invention is to provide a drill structure that will provide the option of full journal bearing support at the drill point and increased machining accuracy.

Furthermore, it is an object of this invention to provide a drill structure that will insure maximum support and acceptable relief for the cutting lips and the chisel point.

A further object of this invention is to provide an improved solid carbide cutting tip to be used in conjunction with a tubular shank.

DESCRIPTION OF THE INVENTION

These and other objects of the invention will become apparent from reading the following specification and description of a preferred embodiment depicted in the drawings which is intended to illustrate, but not to restrict, the scope of the invention.

FIG. 1 is a fragmentary side elevation illustrating the drill mounted in a drilling or boring machine spindle equipped for continuous high pressure coolant supply. Two forms of coolant supply are depicted, though it is understood that both could not be used simultaneously;

FIG. 2 is an enlarged fragmentary side elevation of the cutting end or drill point of a first embodiment of the drill;

FIG. 3 is an end view of the first drill point embodiment as projected from FIG. 2;

FIG. 4 is a sectional view of the drill point taken along the line 4—4 from FIG. 2, detailing the construction of the first embodiment;

FIG. 5 is an enlarged fragmentary side elevation of the cutting end or drill point of a second embodiment of the drill;

FIG. 6 is an end view of the second drill point embodiment as projected from FIG. 5;

FIG. 7 is a sectional view of the drill point taken along the line 7—7 from FIG. 5 detailing the construction of the second embodiment.

Referring now to FIG. 1, drill 10 embodying the principle of the invention is shown mounted in spindle 14 penetrating workpiece 21 shown in sectional view. In this Figure, two modes of coolant supply are depicted, though it is immediately obvious that both modes could not be used simultaneously. Since it is an object of this invention to provide a drill construction that will permit the interchangeable utilization of high pressure, high volume coolant suppled through either the inner diameter (OD FLUSH - Mode 1), or over the outer diameter (ID FLUSH - Mode 2) both modes will be described now separately.

MODE 1 - ID COOLANT SOURCE

The drill is intended for either general purpose or specialized use in drilling machines or boring machines that clamp the work rigid and rotate the drill, or it may be used with equal effectiveness in machines which mount the drill in a stationary spindle while the work is rotated and fed relative to the drill. In the embodiment described in this mode, where the coolant is to be pumped through the spindle and drill to the drill point, workpiece interface and exhausted through the annulus created by the drill's outer diameter and the hole's inner diameter, spindle 14 represents either the rotating spindle of a drilling machine or the stationary spindle of a machine such as the turret lathe.

The shank 27 of the drill is secured to the spindle 14 by collet and chuck arrangement 13, a commercially available structure. Swivel joint 15 represents another commercially available structure for supplying or exhausting coolant from the axial coolant bore 12 of the drill, and for this reason is not depicted in detail. As indicated in the diagram of FIG. 1, to operate the capacity of Mode 1, coolant is pumped from a reservoir (not shown) by a high pressure, high volume source and delivered to the swivel joint conduit 16. The swivel joint 15 contains an internal annular chamber 17 surrounding spindle 14. The spindle contains a lateral bore 18 communicating with chamber 17 and an axial bore 19 in the spindle such that the coolant entering conduit 16 is conducted to the spindle bore 19 under pressure. Collet and chuck arrangement 13 secures the drill firmly and accurately in axial alignment with the spindle and provides a fluid tight connection so that the coolant may flow without leakage from the lower end of the spindle bore 19 to the upper end of the drill bore 12. It is understood that the chucking and coolant conduit means described above is selected to demonstrate the principles of one mode of utilization of this invention, and that the coolant is supplied through the spindle to the drill for discharge at its cutting end whether the drill is rotated relative to the work or vice versa as indicated above; nor should the specific collet and swivel joint indicated be in any way considered limiting with respect to the general use of the drill in this embodiment.

To further characterize the drill's operation in Mode 1, it is readily apparent that a guide bushing (similar to bushing 23) may or may not be necessary to assist drill alignment as the cut is initiated. In any event, in Mode 1 operation, it is immediately apparent that guide bushing 23 could not be used as diagrammed, since the restriction imposed by bushing shoulder 28 and reduced inner diameter 29 would positively block all effluent. A larger egress means would have to be provided. (Use of guide bushing 23 will be explained in detail in Mode 2 operation.) During the cut, colant is admitted to the blind hole through the expanded and outwardly tapering orifice 20 at the drill point. At this point, the coolant performs three primary functions. Implemented by the unobstructed and broad diameter of the axial drill bore 12 and outwardly tapering orifice 20, any commonly used machining oil/coolant, oil base or water soluble, can be supplied at both a high volume and high pressure:

1. To function as the sole swarf removal medium;
2. To effectively lubricate all cutting and bearing surfaces that exist between the tool and workpiece; and
3. Owing to a sustained high volumetric flow rate, effectively cool both drill contact surfaces and the surrounding work medium. The coolant and entrained swarf are then collected by suitable means (not shown), separated (commonly, swarf is usually left to settle to the bottom of a sump) and the coolant is then recirculated.

MODE 2 - OD COOLANT SOURCE

The purpose of this embodiment is to seek an improved surface finish in the workpiece by preventing the fines and swarf generated by the drilling operation from contacting the inner surfaces of the hole being machined. A further advantage is realized in the fact that the tendency of "chip-jams" to occur in the machining of extremely deep holes is reduced by exhausting the swarf through the inner diameter of the drill, or drill bore 12, and thus preventing their accumulation at bushing shoulders, in drill flutes or any of the other commonly recognized flow restrictions that precipitate this event. It is immediately apparent that this embodiment requires the utilization of a sealed clamping arrangement similar to bushing 23 and eliminates the use of coolant supply conduits similar to swivel joint 15. Further required is that axial bore 19 in spindle 14 be extended to the spindles termius, as is currently the case in most trepanning operations where cuttings are similarly exhausted through the spindle bore.

To characterize the drill's operation in Mode 2 it is necessary to seal the annular chamber 22 generated between the drill shank 27 and the hole's inner diameter so that coolant supplied to the chamber under pressure will force all swarf and ships through drill point orifice 20 and into drill bore 12, discharging them through the spindle bore. In FIG. 1, bushing 23 is first fit to the drill shank 27. The bushing's reduced diameter 29 provides sufficient clearance for rotational and axial movement of the drill shank, but the gland created by 0-ring 25 provides an effective high perssure coolant seal. The bushing's lower bore is of greater diameter and is designed to accommodate full retraction of the drill point from the workpiece as well as guide the drill during the initial penetration of thw work. The bushing may be clamped or fastened against the work by a number of commercially available devices for this purpose. Means such as 0-ring 26 provide an effective coolant seal between the bushing and the work. High pressure, high volume coolant is then supplied to the drill during its operation through bushing conduit 24 resulting in all effluent being discharged upwardly and axially through the drill bore and spindle bore as stated above. While the utilization of bushing 23 described in the embodiment of this mode of operation is not meant to restrict the scope of the drill's operation and should not therefore be considered as limiting, an effective sealing device similar to bushing 23 must be used to create annular chamber 22 and a selection of them are commercially available.

Referring now to the elevations and cross-sectional views of the drill point where like numbers describe like characteristics of structure, its versatile structure and fabrication technique will be explained.

FIG. 2 shows a fragmentary side elevation of the simple, general purpose drill point embodied in this invention. The drill point body 11 is fabricated as an intact and distinct unit and is normally constructed of high speed steel, a sintered metal, or a durable oxide. While the body 11 may be machined from drill rod, tool steel, or other suitable high hardness materials, recent advances in powdered metallurgy permit molding, consequently rendering carbide doubly attractive. The point body 11 is of greater diameter than the drill shank 27 and can be detachably connected, glued by compounds such as epoxy resin, or brazed (51) to the shank as shown in FIG. 4. The drill shank 27 consists of any commercially available tubing or prebored drill rod whose physical and mechanical properties include a structural rigidity and shear modulus sufficient to sustain the axial and torsional loads to which the drill will be subjected. Such loads are a function of the physical properties of the intended work as well as the feeds and speeds at which the tool will be operated. Since one of the prime objects of the invention is to avoid the deleterious effects of self-excited chatter vibrations, which have been partially negated by the prerequisite construction of the tubular shank, natural frequencies of the material selected for shank construction should also be considered.

The drill point depicted in FIGS. 2–4 shows a general purpose point with an included angle of 118°, Angle B; 0° or neutral back point taper, Angle D; 0° or neutral lip rake 32; a 45° chamber at the base of the drill point, Angle C; and a 30° axial relief at the drill point end of the shank bore 12, Angle A. None of the specifications, however, are to be considered fixedly prerequisite; all above-identified angles may vary within acceptable limits to subscribe to attendant machining conditions by one so skilled in the art. With the additional aid of FIGS. 3 and 4, other generalized features of the drill point include cutting lips 33, flank relief or land portions 31, chisel point 37, and drill point orifice 20. Lower point body relief 34 is an optional expedient if increased coolant volumetric flow rates are desired. However, should high speeds and feeds require greater point rigidity, cutting lips may retain a neutral lip rake 32 through the chamfer, and lower point body relief 34 may be disregarded. Each flank relief or land portion 31 has relieved or lip clearance sections, as at 31', and a journal means 31 having a bearing surface. The fabrication of drill point orifice 20 is extremely crucial to the success of this drill in its intended application to either mode of operation. The geometry of the drill point body obtains from attempts to render the orifice 20 as large and unobstructed as possible without sacrificing the structural characteristics necessary for the cutting lips to sustain maximum applications of torsional stress and the chisel point to sustain the increasing axial loads as a consequence of increasing lip wear. In this respect, it has been found expedient to seat the drill shank below the base chamfer 35 of the point body and relieve the shank bore 12° - 30° from the axis to render it more accessible. Similarly, the internal bore of the drill body is extended in a conical configuration of 45°, as at 20, beyond the shoulder that will seat the drill shank in order to open the orifice in the maximum fashion permissible. In grinding or preforming conical orifice 20, it is essential that sufficient body remain below the cone's terminus to permit a moderate amount of regrinding so that acceptable tool life levels may be realized. Similarly, however, the extent of usable point body remaining below the cone's terminus should not be so great as to prevent the turbulence of the high pressure coolant's efflux from, or entrance to, the orifice from coming in effective contact with the full breadth of the cutting lips. This will depend on the nature of the work to be performed.

The distance from the furthermost point on the cutting end of said drill point body 11, i.e., at 37, to the relieved open areas adjacent the innermost end of said bore is greater than one-third of the total length of the drill point body. The tubular shank has an outside diameter approximately 40 to 60 percent of the width of said drill point body means.

FIGS. 5 and 7 depict a variation of the general purpose drill point available to this drill by virtue of its simple construction. Since flutes and lands have been eliminated as a result of the swarf removal capacity of the high pressure coolant, the drill point is no longer constrained to a specific number of cutting lips defined by a like number of flutes. In fact, multiple odd numbers of cutting lips lend themselves to increasing feed rates and greater accuracy, though admittedly fabrication and regrinding costs are increased in such point body construction. Furthermore, by virtue of reduced shank diameter, idealized journal bearing theory can be fully employed to increase drilling accuracy and reduce land and lip wear, simultaneously improving surface finish. Specifically, FIG. 5 shows a drill point body 11 with three cutting lips 33, equally spaced, a needle point 60, and a full journal encasing the lower portion of the point body. The journal may be attached to point body 11 by force fitting, epoxy resin, brazing, or any conveniently available means. (It should be noted that 180° of the journal have been removed in FIG. 5, as defined by partial section 5—5 in FIG. 6, so that structural features of point body 11 will be less confusing.) As stated above, like numbers define like characteristics of the previous drill point embodiment. Again, a specific included point angle, point body back taper, point body chamfer and lip rake and relief can be varied depending on the nature of the work to be accomplished. It should be apparent that the utilization of chip breakers, negative rakes, or any other common shop expedient can be utilized in the construction of this simple and unconstraining drill and drill point, and the two drill point embodiments depicted in the drawings are not to be considered as restricting in this respect.

While only two embodiments of the drill point have been shown and described, it is obvious that many modifications will occur to those of ordinary skill in the art without departing from the scope of the appended claims.

What is claimed is:

1. An improved high speed deep hole drill, said drill comprising a tubular shank having an inside diameter and an outside diameter, said diameters being respectively uniform throughout a substantial length of said shank, a drill point body means having a length and width and a bore therein, said bore extending a predetermined distance into said point body means and receiving one end of said tubular shank, said tubular shank being secured against movement within said bore, said point body means having at least two cutting lips and accompanying flank relief and lip rake portions, the arrangement being such that said cutting lips are fully supported by said flank relief portions during a drilling operation, said flank relief portions having relieved sections and journal means, said combined journal means having a bearing surface means of greater diameter than the outside diameter of said tubular shank, and adapted to provide bearing support for said drill in operation, said drill point body means being relieved at the inner end of said bore so as to provide a plurality of open areas between the end of said tubular shank secured within said bore and said lip rake portions, said open areas adapted to provide communication between said tubular shank, said cutting lips and the tubular space between the outside diameter of said tubular shank and the wall of the hole being drilled whereby coolant may be forced through the inside of said tubular shank to cool said drill point body means and said work and to flush chips produced by said drill out of said hole.

2. A drill as in claim 1 wherein said coolant is interchangeably supplied through either said tubular space or said inside of said tubular shank and exhausted through remaining regress means.

3. A drill as in claim 1 wherein said coolant is forced through said tubular space or annulus between drill shank and hole and exhausted through said inside of said tubular shank.

4. A drill as in claim 1 wherein said drill point body means is of integral construction.

5. A drill as in claim 1 wherein said bearing surface means completely surrounds said drill point body means and is circular in configuration to provide full bearing support to said drill when it is in operation.

6. A drill as in claim 5 wherein said journal means comprises a ring of metal fixedly secured to said flank relief portions of said drill point body means.

7. A drill as in claim 1 wherein said drill body means is chamfered at its base, the chamfer areas extending from the juncture of said point body means with the external diameter of said tubular shank to an area of said flank relief portions adjacent said journal means.

8. A drill as in claim 7 wherein portions of said chamfered areas are relieved.

9. A drill as in claim 1 wherein said bore in said drill point body means in countersunk at approximately 45° to provide said open areas to facilitate coolant flow.

10. A drill as in claim 9 wherein the end of said tubular shank is countersunk from about 12° to 30° from the axis of said shank to further facilitate coolant flow in conjunction with said countersink in said drill point body means.

11. A drill as in claim 1 including a chisel point on said drill point body means, and wherein there are two cutting lips and accompanying flank relief and lip rake portions on said drill point body means.

12. A drill as in claim 1 wherein there are at least three cutting lips with accompanying flank relief and lip rake portions on said drill point body means and said drill point body means is of integral construction.

13. A drill as in claim 1 wherein said drill point body means is integrally constructed of a sintered metal.

14. A drill as in claim 1 wherein said drill body means is integrally constructed of an oxide metal.

15. A drill as in claim 1 wherein the distance from the furthermost point on the cutting end of said drill point body means to said relieved open areas adjacent the innermost end of said bore is greater than one-third of the total length of said drill point body means.

16. A drill as in claim 1 wherein said tubular shank has an outside diameter approximately 40 to 60 percent of the width of said drill point body means.

17. An improved high speed deep hole drill body for use with a tubular shank, said drill body comprising a drill point body means having a length and width and a bore therein, said bore extending a predetermined distance into said point body means and adapted to receive one end of said tubular shank, said point body means having at least two cutting lips and accompanying flank relief and lip rake portions, the arrangement being such that said cutting lips are fully supported by said flank relief portions having relieved sections and journal means, said combined journal means having a bearing surface means of greater diameter than the outside diameter of said tubular shank, and adapted to provide bearing support for said drill in operation, said drill point body means being relieved at the inner end of said bore so as to provide a plurality of open areas between the end of a tubular shank received within said bore and said lip rake portions, said open areas adapted to provide communication between a tubular shank, said cutting lips and the tubular space between the outside diameter of a tubular shank and the wall of the hole being drilled whereby coolant may be either forced down said tubular space or the inside of a tubular shank to cool said drill point body means and said work and to flush chips produced by said drill out of said hole.

18. A drill body as in claim 17 wherein said drill point body means is of integral construction.

19. A drill body as in claim 17 wherein said bearing surface means completely surrounds said drill point body means and is circular in configuration to provide full bearing support to said drill when it is in operation.

20. A drill body as in claim 19 wherein said journal means comprises a ring of metal fixedly secured to said flank relief portions of said drill point body means.

21. A drill body as in claim 17 wherein said drill body means is chamfered at its base, the chamfer areas extending from the juncture of said point body means with the external diameter of a tubular shank adapted to be received therein to an area of said flank relief portions adjacent said journal means.

22. A drill body as in claim 21 wherein portions of said chamfered areas are relieved.

23. A drill body as in claim 17 wherein said bore in said drill point body means is countersunk at approximately 45° to provide said open areas to facilitate coolant flow.

24. A drill body as in claim 17 including a chisel point on said drill point body means, and wherein there are two cutting lips and accompanying flank relief and lip rake portions on said drill point body means.

25. A drill body as in claim 17 wherein there are three cutting lips with accompanying flank relief and lip rake portions on said drill point body means and said drill point body means is of integral construction.

26. A drill body as in claim 17 wherein said drill point body means is integrally constructed of a sintered metal.

27. A drill body as in claim 17 wherein the distance from the furthermost point on the cutting end of said drill point body means to said relieved open areas adjacent the innermost end of said bore is greater than one-third of the total length of said drill point body means.

28. A drill body as in claim 17 wherein said bore has a diameter approximately 40 to 60 percent of the width of said drill point body means.

* * * * *